United States Patent [19]

Hassler et al.

[11] Patent Number: 4,975,885

[45] Date of Patent: Dec. 4, 1990

[54] DIGITAL INPUT STAGE FOR AN ULTRASOUND APPARATUS

[75] Inventors: Dietrich Hassler, Uttenreuth; Erhard Schmidt; Peter Wegener, both of Erlangen, all of Fed. Rep. of Germany

[73] Assignee: Siemens Aktiengesellschaft, Berlin and Munich, Fed. Rep. of Germany

[21] Appl. No.: 413,293

[22] Filed: Sep. 27, 1989

[30] Foreign Application Priority Data

Sep. 30, 1988 [DE] Fed. Rep. of Germany ....... 8812400

[51] Int. Cl.$^5$ .............................................. G03B 42/06
[52] U.S. Cl. ........................................... 367/7; 367/11
[58] Field of Search ................................ 367/7, 11, 90; 364/413.25; 128/660.05, 660.07, 660.08, 660.09, 661.1, 662.01; 73/861.25

[56] References Cited

U.S. PATENT DOCUMENTS

| | | | |
|---|---|---|---|
| 4,324,258 | 4/1982 | Huebscher et al. | 73/861.25 |
| 4,373,395 | 2/1983 | Borburgh et al. | 128/661.01 |
| 4,408,495 | 10/1983 | Couch et al. | 73/655 |
| 4,509,525 | 4/1985 | Seo | 128/660.05 |
| 4,846,188 | 7/1989 | Yoshioka | 128/660.05 |

FOREIGN PATENT DOCUMENTS

| | | |
|---|---|---|
| 0010304 | 4/1980 | European Pat. Off. |
| 0081045 | 9/1982 | European Pat. Off. |
| 0170072 | 7/1985 | European Pat. Off. |
| 3445169 | 6/1986 | Fed. Rep. of Germany |
| 2375764 | 12/1976 | France |
| 2088668 | 6/1982 | United Kingdom |
| WO81/00807 | 9/1980 | World Int. Prop. O. |

OTHER PUBLICATIONS

"Beitrag Zur System Theorie Der Ultraschall-Plus-Doppler-Technik Zur Blutströemungsmessung" I, II III (Teilan), Hassler Ultraschall In Der Medizin, vol. 8, Nos. 2, 3 4 Apr., Jun. and Aug. 1987, (no translation).

Primary Examiner—Thomas H. Tarcza
Assistant Examiner—Daniel T. Pihulic
Attorney, Agent, or Firm—Hill, Van Santen, Steadman & Simpson

[57] ABSTRACT

An ultrasound apparatus has a transducer array which includes a number of individual transducer, each transducer having a channel exclusively associated therewith. In an input stage for the ultrasound apparatus, an analog stage is provided in each channel to which the echo signals for a transducer associated with that channel are supplied. This analog stage concludes with an analog-to-digital converter in each channel. The output of the analog-to-digital converter is connected to a further processing circuit in each channel for the acquisition of Doppler signals of moving target echoes. A combined ultrasound imaging device and Doppler device is thus achieved, which allows the acquisition of Doppler signals with the digital input technology of the ultrasound imaging processing circuit. This permits expansion of digital operating RF input components of imaging devices to include Doppler signal processing.

12 Claims, 4 Drawing Sheets

DIGITAL INPUT STAGE FOR AN ULTRASOUND APPARATUS

BACKGROUND OF THE INVENTION

1. Field of the Invention

The present invention is directed to an ultrasound apparatus, and in particular to a digital input stage for an ultrasound apparatus which processes signals for the purpose of ultrasound imaging as well as processing Doppler signals.

2. Description of the Prior Art

Ultrasound devices are known having a digital input stage which includes a processing circuit having a number of channels corresponding to the number of transducers in a signal-generating and signal-receiving transducer array. Each channel in the processing circuit concludes with an analog-to-digital converter.

When high quality B-scanners operate with ultrasound frequencies up to 10 MHz, and when such scanners have a number of complicated scan forms, it is necessary to undertake many finely-graduated switching events for the ultrasound beam control and focusing. Digital processing of the radio-frequency signals is suitable for this purpose. The use of digital technology for processing Doppler signals, however, is conventionally considered unsuitable, due to the inability of the analog-to-digital conversion to achieve the necessary signal dynamics which are needed to process echoes of permanent objects simultaneously with moving objects, for example, vein wall regions simultaneously acquired with the Doppler signal. It is preferable, however, that imaging systems be capable of also acquiring Doppler signals, at least as a option. Commercially available high performance equipment having a correspondingly low ultrasound frequency of, for example, 5 MHz includes input stages for Doppler signals which operate in analog fashion. The exclusive use of analog technology for generating the image, however, will not be retained in future devices because the aforementioned nominal frequencies up to 10 MHz can be achieved only with difficultly in analog technology.

The characteristics of Doppler signals of blood corpuscles are analyzed in an article by D. Hassler entitled "Beitrag zur Systemtheorie der Ultraschall-Impuls-Doppler-Technik zur Blutstroemungsmessung" from the publication Ultraschall in der Medizin, No. 8, 1987 at pages 102–107, 152–154 and 192–196. As reported in that article, the blood corpuscles (moving targets) from the small signal collecting area of a vein have a maximum dynamic of 30 through 40 dB, and typically lie 30 through 40 dB below the amplitude of permanent echoes from stationary tissue. Due to the limited topical resolution, it is unavoidable, especially given a signal collecting area close to the vein wall, that permanent echoes and moving target echoes will simultaneously appear. The moving target echoes can be discriminated from the permanent echoes on the basis of the frequency shift of the moving target echoes. A filtering method for separating the signals on this basis must therefore be used. This assumes, however, that the linear superposition of the two components is preserved in the signal flow chain preceding the filtering. Signal mixing at non-linear segments must be avoided.

It is known to acquire Doppler signals from an ultrasound applicator, in addition to the ultrasound signals, from European application 0 010 304. This is accomplished in this published application using mechanical scanners or electronic scanners with analog signal processing for sweep and/or focusing, given observation of the required signal-to-noise ratio. An example of a conventional digital RF input stage (front end) for a B-scanner is described in European application 0 170 072. Due to the aforementioned demands which are necessary to process signals having high dynamics at a high scan rate, hitherto unresolved technical problems have prevented the expansion of a conventional device of this type to also undertake Doppler signal processing.

It is generally believed, however, that digitally operating input stages represent the technically optimum solution for high quality scanners. In high performance equipment, one expects the ability to operate using ultrasound nominal frequencies between 2 and 10 MHz, and the ability to conduct a number of scan forms such as, for example, electronic sector scan, trapezoid scan and parallel scan without projecting edge length. These demands require a large range for the signal delay with extremely finely graduated variability. The most developed technique for meeting these demands is adjustment of the digital delay of the RF signals.

It is typical in such devices to use sixty-four input channels, thus requiring sixty-four analog-to-digital converters with eight bits, with a scan rate having a maximum of 40 MHz. This is sufficient for the image acquisition. To avoid the aforementioned non-linear characteristic, a bit width of at least fourteen bits is necessary in Doppler signal processing, because 30 through 40 dB additional dynamics are present which require an additional six bits. The current technical limit, however, is at twelve bits, given a scan rate of 20 MHz.

SUMMARY OF THE INVENTION

It is an object of the present invention to provide an input stage for a combined ultrasound-Doppler imaging system, which permits the acquisition of Doppler signals with the digital input technology used for the ultrasound signal processing.

The above object is achieved in an input stage having a number of channels, corresponding to the number of transducers in the ultrasound applicator, for processing the incoming signals for use in generating an ultrasound image, the echo signals being first inducted through an analog stage which concludes with an analog-to-digital converter. The output of the analog-to-digital converter is connected to a further signal processing circuit, in each channel, for the acquisition of Doppler signals of moving target echoes. The analog stage and the Doppler signal processing circuit share portions of a processing loop, which returns to the analog stage.

In a preferred embodiment, the signal processing loop for each channel shared for ultrasound imaging and Doppler signals includes a subtraction stage preceding the analog-to-digital converter. The subtraction stage subtracts the echo signals of the preceding ultrasound pulse in correlated time from the current echo signals, given a plurality of successive transmission pulses into the same target region. The loop further includes an amplifier having a switchable gain. The Doppler signal processing circuit for moving targets includes a switch in the loop following the analog-to-digital converter which, depending upon the selected gain of the amplifier, supplies the individual bits of the analog-to-digital converter, differently weighted, to an adder for further signal processing.

The circuit disclosed herein uses analog-to-digital converters having a smaller bit width, and components can be used which are so inexpensive that duplication of the same structure for sixty-four channels is still more economic than the use of an additional analog circuit for the Doppler processing.

Moreover, the dynamics of the signal to be digitized are lowered, and the problem of processing signals having a large dynamic range is transferred to the digital-to-analog conversion, which is easy to realize.

In a further embodiment of the invention, a second memory, in addition to the memory which is conventionally used for ultrasound signal processing, is provided in which correction values are stored which compensate for amplitude errors of the analog components and in the digital-to-analog converters, following a balancing or matching phase which is conducted in two balancing steps. The difference between signals acquired from a test signal in a first balancing step, and the signals acquired from the same test signal in a second balancing step, are stored as correction values in the second memory in the balancing phase.

Because the amplitude errors of the components are compensated, high precision, and therefore expensive, components are not needed in the realization of the circuit.

DESCRIPTION OF THE PREFERRED EMBODIMENTS

The general concept of how the Doppler technique can be accommodated in a digital B-imaging device is described in the article "Topoflow-A Digital Full Range Doppler Velocity Meter," Brandestini, IEEE Trans. Sonics Ultrasonics, Vol. 25, No. 5, September 1978, pages 287-293.

Figure 1:
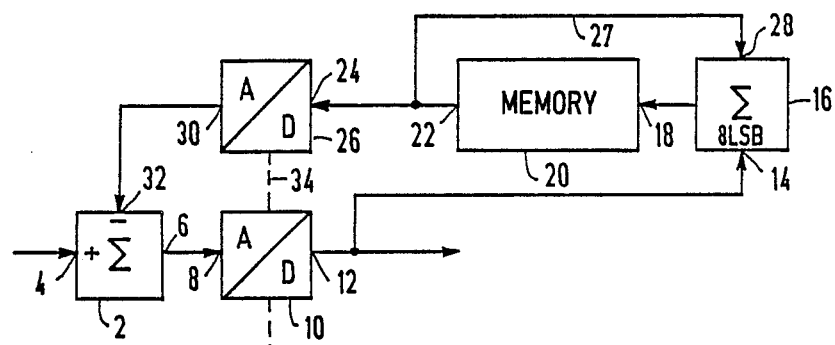
FIG. 1 is a schematic block diagram of known circuitry for suppressing echoes from stationary objects.

The fundamental principle described in that article is shown in FIG. 1. The circuit of FIG. 1 is for suppressing echoes from stationary objects (permanent echoes) with a first order filter, and for digitizing the moving target echoes. The sum signal from a reception transducer array is supplied to the positive input 4 of an analog subtractor 2. The output 6 is supplied to the input 8 of an analog-to-digital converter 10. The analog-to-digital converter 10 digitizes the analog signal with eight bits. The output 12 of the analog-to-digital converter 10 is supplied to a further signal processing circuit (not shown) as well as to an input 14 of a digital sixteen bit adder 16. Only the eight least significant bits (LSB) at the input 14 are occupied. The output of the adder 16 is connected to the input 18 of a sixteen bit memory 20. The memory capacity of the memory 20 is 128 words. The memory 20 is organized according to the "first in-first out" (FIFO) principle. The output 22 of the memory 20 is connected to the input 24 of a sixteen bit digital-to-analog converter 26 as well as to the second input 28 of the adder 16 via a return line 27. The analog output 30 of the digital-to-analog converter 26 is connected to the inverting input 32 of the subtractor 2.

The circuit of FIG. 1 operates as follows. The echo signals of an ultrasound scan beam are stored in digital form. The echoes associated with a subsequent transmission burst are subtracted from the stored echoes of the preceding burst in real time. If there has been no motion in the subject, identical echo signals will be received as a response to the successive transmission bursts, and the difference between the two signals is therefore zero. Moving boundary surfaces in the subject result in differences between the received signals, with more rapid motion resulting in larger differences. The difference signal thus represents the linearly frequency-weighted (differentiated) Doppler signal. The digitization is executed only with the bit depth which the difference signal requires. The permanent echo requires a much larger word width, and is slowly acquired by the multiple adding of initially overdriven difference signals. The re-conversion into analog form is possible because the digital-to-analog converters are easier to realize than analog-to-digital converters.

The above-described procedure is represented in the following way in the circuit of FIG. 1. The analog difference signal from the subtractor 2 is converted by the analog-to-digital converter 10 with eight bits, and is written into the memory 20 via the sixteen bit adder 16. If the memory 20 is initially empty, only the value "zero" is supplied via the return line 27 to the adder 16, so that the output signal of the analog-to-digital converter 10 is entered as the original value. Because the subtractor 2 also initially subtracts only the value zero, the analog-to-digital converter 10 receives the full permanent echo signal in the first step. Since this signal is much stronger than the moving target echoes, the analog-to-digital converter 10 is overdriven. The maximum value of the eight bit word will therefore be frequently written into the memory 20 as a LSB value. This procedure is repeated until the difference is so small, even for large signal amplitudes, that the analog-to-digital converter 10 is no longer overdriven. When this occurs, the output signal of the analog-to-digital converter 10 represents the differentiated and pulsed Doppler signal in digital form. The dashed line in 34 in FIG. 1 indicates the "boundary" between the analog portion of the circuit and the digital portion.

This known method as exemplified in FIG. 1 is thus applied to a sum signal from the transducer array. In contrast, in the subject matter of the present invention, each reception channel (exclusively associated with a tranducer of an electronic sector scanner array) has a corresponding processing loop allocated thereto, which acts on the undelayed signal from each elementary transducer of the array.

Figure 2:
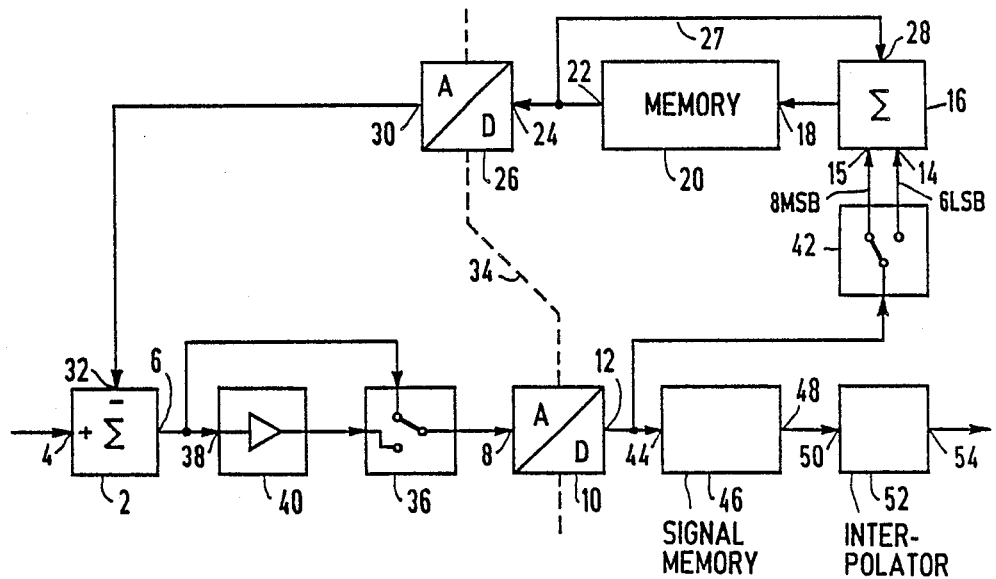
FIG. 2 is a schematic block diagram of a combined ultrasound imaging and Doppler device having a 14 bit digital-to-analog converter constructed in accordance with the principles of the present invention.

A system constructed in accordance with the principles of the present invention is shown in FIG. 2, with components which perform the same function as those in FIG. 1 being identified with the same reference numeral as in FIG. 1.

As noted above, in the circuit shown in FIG. 2 the undelayed signal from an individual transducer of the transducer array is supplied to the analog input 4 of the subtractor 2, instead of the sum signal as in the prior art. The signal from the elementary transducer may be supplied to the analog input 4 of the subtractor 2 via a depth gain control amplifier. The output 6 of the subtractor 2 is directly connected to the input 8 of the analog-to-digital converter 10 via a switch 36. The output 6 of the subtractor 2 is also supplied to the input 38 of an amplifier 40, with the amplified output of the subtractor 2 (i.e., the output of the amplifier 40) being supplied to the other pole of the switch 36, and thus to the input 8 of the analog-to-digital converter 10.

The amplifier 40 has a gain factor of v=64. In combination with the switch 36, the amplifier 40 forms an amplifier stage having a switchable gain factor, the selectable gain factors being v=1 and v=64. The analog-to-digital converter 10 converts the analog signal with a scan rate of 30 MHz into a digital eight bit signal. The output 12 of the analog-to-digital converter is connected to the adder 16 via switch 42. The adder 16 in FIG. 2 is a fourteen bit adder. The switch 42 permits the eight most significant bits (eight MSB) to be supplied to the input 15 of the adder 16, and the six least significant bits (six LSB) to be supplied to the input 14 of the adder 16.

The memory 20 in the circuit of FIG. 2 has a capacity of 4,000 words of a bit length of fourteen, and is organized according to the first in-first out (FIFO) principle. The output 22 of the memory 20 is connected to the input 28 of the adder 16 via a return line 27. The output 30 of the digital-to-analog converter 26 is connected to the input 32 of the subtractor 2 so that a processing loop is formed.

For further signal processing, the output 12 of the analog-to-digital converter 10 is connected to the input 44 of a signal memory 46. The digitized Doppler difference signal is stored in the memory 46 over a length of, for example, 1,000 words having a length of 8 bits each, with a scan rate of 30 MHz, and is delayed according to the requirements for sweep and focusing. Given a scan rate of 30 MHz, a maximum of 33 microseconds delay is achieved in the sweep. The signal is also read out with 30 MHz, and is supplied from the output 48 of the signal memory 46 to an input 50 of a linear interpolator 52. The linear interpolator 52 doubles the scan rate, so that center frequencies of 7 MHz are also reliably controlled.

In a subsequent circuit (not shown) the digital signals of all of the channels, delayed corresponding to the sweep angle and/or the focus position, are added together, and as a sum signal, form the radio-frequency Doppler signal, received focused. With or without intervening quadrature demodulation, the sum signal can be supplied to a further digital comb filter (not shown) which compensates for the frequency dependency of the transfer factor of the circuit for moving target identification. A frequency-independent, high pass filtered Doppler signal is then available for further processing. The formation of the depth regions by signal blanking (range gates) typically follows this type of broadband separation of moving target echoes from the permanent echoes.

To acquire the permanent echoes with the same signal processing used for obtaining a B-image, the amplifier 40 and the switch 36 are disposed in a portion of the processing loop between the subtractor 2 and the analog-to-digital converter 10. Upon reception of the echo signals of a first burst, the signal is digitized without preamplification, i.e., directly, so that the analog-to-digital converter 10 is not overdriven. The unfalsified permanent echoes are thus obtained in the signal memory 46 and, as described above, electronic sweep and focusing can be undertaken with suitable delay to construct a B-image. Both the image signals (permanent echoes) and the Doppler difference signals can thus be stored in the signal memory 46 in time sequence. After the first transmission pulse or burst, the image signals are contained in the memory 20, whereas the Doppler difference signals are contained in the signal memory 46 after further bursts directed at the same target region. The further processing of the image signals is undertaken according to known techniques as described, for example, in U.S. Pat. No. 4,373,395, corresponding to German OS 29 42 049.

In contrast to the operation of the known circuit of FIG. 1, the digital permanent echo in the circuit of FIG. 2 is supplied to the eight MSB inputs 15 of the adder 16 via with the switch 42, in proper place position. An echo signal, stored with eight bit precision, is thus already available after the first burst for the difference formation in the subtractor 2. It is not required to undertake an initial addition in order to acquire this signal. Time is thus saved, which is particularly important when a Doppler image (flow imaging) is to be produced. Because of time considerations, no more than 5 through 10 bursts per scan direction can be permitted, even though a much higher number would be desireable. In comparison to the ideal situation with a fourteen bit analog-to-digital converter 10, only one burst per beam direction is lost, given the use of the eight bit analog-to-digital converter 10 of FIG. 2, whereas a number of bursts per beam direction would be lost in the circuit of FIG. 1. Given the use of the eight bit analog-to-digital converter 10 in the embodiment of FIG. 2, a first Doppler signal is available after the third burst. After the second burst, the analog-to-digital converter 10 is driven via the pre-amplifier 40 in combination with the switch 36. Because the memory 20 permits a precision of the echo portrayal having fourteen bits, six further bits must still be added to the first eight bits. Accordingly, the amplifier 40 is switched to a gain $v=2^n=2^6=64$, and the eight bit word of the analog-to-digital converter 10 is shifted by the switch 42 in the direction of the least significant bits by n=6 binary places, and is added to the contents of the memory 20.

Figure 3:
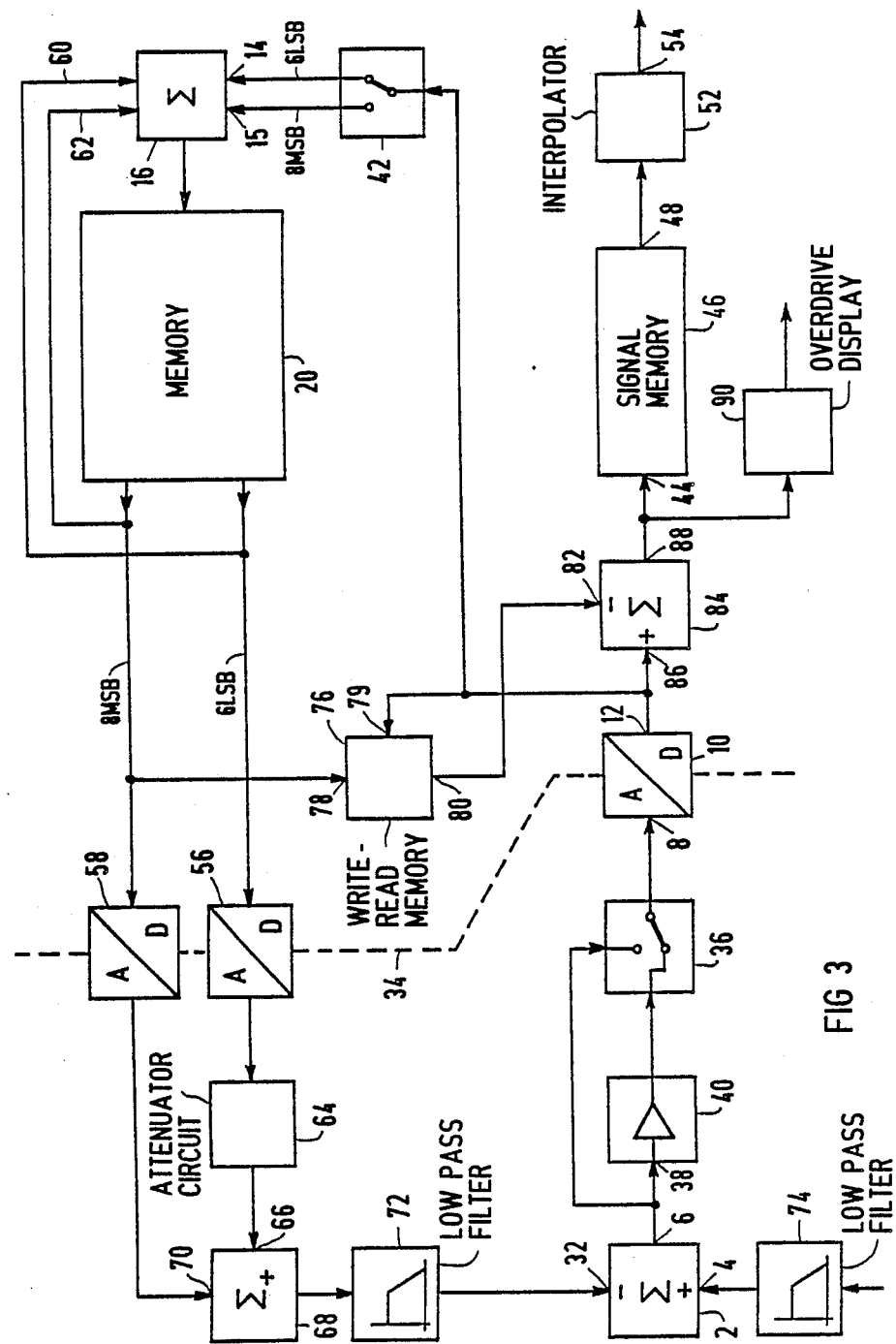
FIG. 3 is a schematic block diagram of a combined ultrasound imaging and Doppler device having an 8 bit and a 6 bit digital-to-analog converter and an error correction circuit, constructed in accordance with the principles of the present invention.

A further embodiment of the invention is shown in FIG. 3, which uses two digital-to-analog converters each having a smaller bit width than the digital-to-analog converter 26 in the embodiment of FIG. 2. The expensive, fast digital-to-analog converter 26 which has a large bit width, for example fourteen bits, given a scan rate of 30 MHz, is replaced in the embodiment of FIG. 3 by two less expensive digital-to-analog converters 56 and 58. In addition, an error correction circuit is provided in the embodiment of FIG. 3. Components identical to those already described in connection with FIGS. 1 and 2 have the same reference symbols in FIG. 3.

The digital-to-analog converter 26 of Figure is divided, in the embodiment of FIG. 3, into a six bit digital-to-analog converter 56 for the six least significant bits and a eight bit digital-to-analog converter 58 for the eight most significant bits. The return line of FIG. 2 is also divided into a six bit return line 60 and into an eight bit return line 62, which are connected to the adder 16 in a manner which preserves the relationship between the binary places. The signal at the output of the digital-to-analog converter 56 is supplied to the input 66 of an analog summing stage 68 via an attenuator circuit 64. The attenuator circuit 64 reduces the amplitude of the signal by a factor 1/64. The output of the second digital-to-analog converter 58 is supplied to the other input 70 of the summing stage 68. The sum signal is supplied to the inverting input 32 of the subtractor 2 via a low-pass filter 72. The non-inverting input 4 of the subtractor 2 is preceded by an identical low pass filter 74. The function of the low pass filters 72 and 74 will be described in detail below.

The error correction circuit set forth below additional compensates for the non-linearities of the two digital-to-analog converters 58 and 59.

As shown in FIG. 3, a write-read memory 76 has an address input 78 connected to the eight MSB output of the memory 20. The write input 79 of the write-read memory 76 is connected to the output of the analog-to-digital converter 10, and the read output 80 of the write-read memory 76 is connected to the inverting input 82 of a further subtractor 84. The subtractor 84 has an input 86 connected to the digital output of the analog-to-digital converter 10, and an output connected to the input 44 of the signal memory 46. The output 88 of the subtractor 84 is also supplied to an input of an overdrive display 90.

If the digital-to-analog converter 58 has a linearity which is precise enough for fourteen bits, and if the analog addition in the summing stage 68 occurs free of error, the division of the fourteen bits between the two digital-to-analog converters 56 and 58 poses no problems. One must assume, however, that these ideal conditions are not present. The write-read memory 76 and the subtractor 84 are provided for that reason. Correction values which compensate the errors of all components in the branch via which the preceding signal is supplied to the subtractor 2 are stored in the write-read memory 76. This branch consists of the digital-to-analog converters 56 and 58, the attenuator circuit 64, the summing stage 68, the low pass filter 72, and the subtractor 2. This compensation occurs as follows.

In a balancing phase of the apparatus, for example after each closing (turn-on) of the mains switch, a test signal in the form of a linear ramp function is supplied to the input 4 via the low pass filter 74 as an analog voltage which reaches or exceeds the maximum acquirable value. This voltage rises only rapidly enough so that all 256 binary values appear at least once given the selected conversion rate of the analog-to-digital converter 10. The memory 20 is erased at the beginning. The eight most significant bits are entered in the memory 20, as described in connection with FIG. 2 for the first burst. The same test signal is supplied to the input for a second time, and is now supplied to the analog-to-digital converter 10 via the amplifier 4 with the switch 36 in a position so that a gain of 64 is provided. The digital words obtained in this manner are added to the previously stored word row as the least significant bits. Care is undertaken to insure that memory words "belong" to one another for the same analog voltage. The memory 20 now contains the test signal represented with fourteen bits.

Another comparison to the test signal would yield a deviation of zero if no errors appeared. However, the errors which are in fact present in the above-identified return branch, for example, the linearity errors of the converter 58, will result in an output signal of the analog-to-digital converter 10 which differs from zero. This deviation is not retained in the memory 76. The deviation value at the output of the analog-to-digital converter 10 is now read-in for each output value of the memory 20, which is interpreted as an address for the memory 76. In normal operation, the deviation value stored in this manner is subtracted from each converted word of the analog-to-digital converter 10, dependent on the eight most significant bits of the memory 20. This subtraction takes place in the subtractor 84 before the storing as a Doppler signal in the memory 46 occurs. Even inexpensive digital-to-analog converters 56 and 58 can thus be used. The correction, however, is only amplification-dependent. In order that the clock frequencies and the switching signals of the digital-to-analog converters 56 and 58 do not have a disturbing effect, the identical low pass filters 72 and 74 are used before the analog-to-digital conversion, or as anti-aliasing filters.

Figure 4:
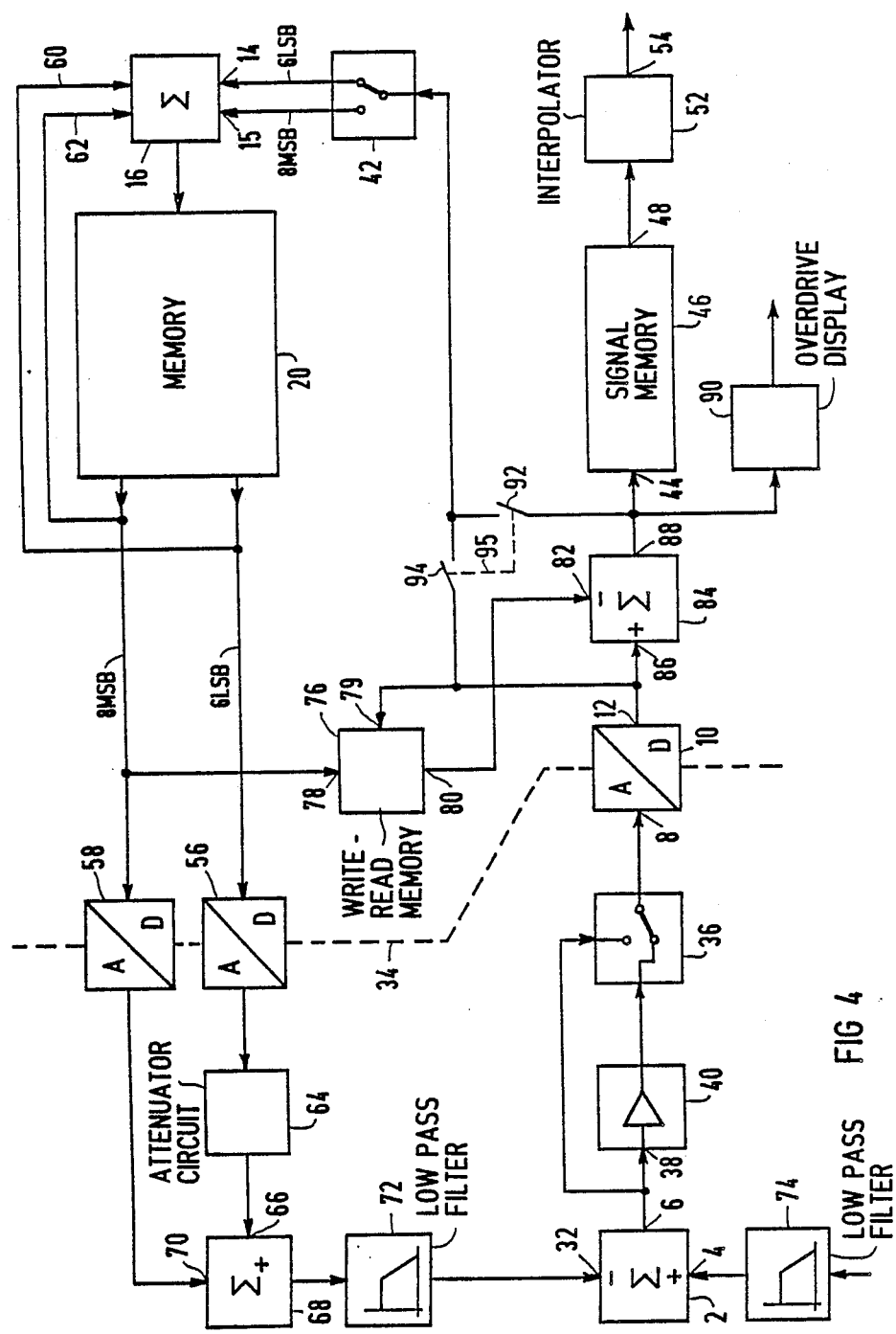
FIG. 4 is a schematic block diagram of a modification of the error correction circuit shown in FIG. 3.

A modification of the circuit of FIG. 3 is shown in FIG. 4. Differing from the circuit of FIG. 3, in the circuit of FIG. 4 the output 88 of the subtractor 84 is connected to the input of the switch 42 via a "make" contact 92 of a ganged switch assembly 95. The "break" contact of the ganged switch assembly 95 is disposed between the output of the analog-to-digital converter 10 and the input of the switch 40. The contacts 92 and 94 are simultaneously actuated after the second burst. This means that the memory 20, in its steady state, is written with the corrected value from the subtractor 84, instead of being directly written with the output signal of the analog-to-digital converter 10. Thus an exact fourteen bit value is stored in the memory 20.

Figure 5:
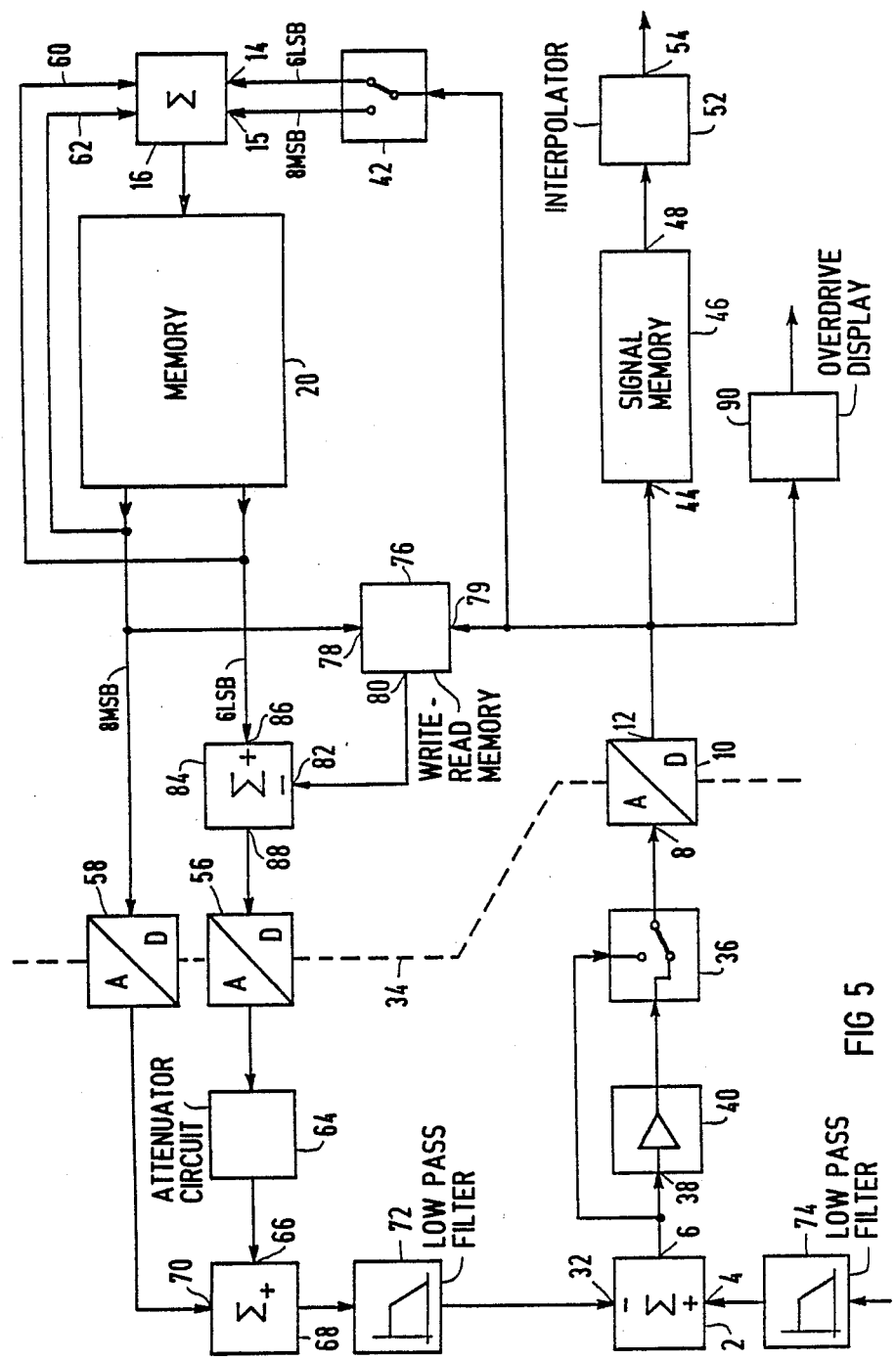
FIG. 5 is a schematic block diagram of a further modification of the error correction shown in FIG. 3.

Another modification is shown in FIG. 5. In the circuit of FIG. 5, the subtractor 84 is interconnected in the line between the memory 20 and the analog-to-digital converter 56. The positive input 86 is connected to the six LSB output of the memory 20, and the output 88 of the subtractor 84 is connected to the input of the digital-to-analog converter 56. This has the same effect, in the circuit of FIG. 5, as operating the ganged switch assembly 95 in the embodiment of FIG. 4 following the second burst, however, in the embodiment of FIG. 5 the same effect is achieved without switching.

The overdrive display 90 informs a user of the apparatus if the signal excursions are to large to be converted without distortion as may occur, for example, due to motion artifacts. This displayed information may be used to identify the Doppler signals as invalid, or to blank them.

In the above described combination of an ultrasound imaging device and a Doppler device, the overall control for focusing and scan of the imaging system can be used unmodified for the Doppler signal processing circuit. An additional analog Doppler stage is not needed for thus purpose. Moreover, the combination disclosed herein requires only a few balancing cycles and a lower circuit outlay is required than for a completely analog combination. The check which is undertaken in the aforementioned balancing phase is suitable for integration as a self-test which can be conducted for servicing as well as by the user.

Although modifications and changes may be suggested by those skilled in the art, it is the intention of the inventors to embody within the patent warranted hereon all changes and modifications as reasonably and properly come within the scope of their contribution to the art.

We claim as our invention:

1. An input stage for a combined ultrasound imaging-/Doppler device having a transducer array consisting of a plurality of individual transducers for transmitting ultrasound pulses to, and receiving echo signals from, an examination subject, each transducer having a channel exclusively associated therewith, said input stage comprising, for each channel:
   an analog processing stage having an input connected to the transducer associated with the channel and including an analog-to-digital converter;
   digital Doppler signal processing means connected to an output of said analog-to-digital converter for acquiring radio-frequency Doppler signals for moving targets in said examination subject; and
   means connected to said output of said analog-to-digital converter for constructing an ultrasound image from said echo signals.

2. An input stage as claimed in claim 1, wherein said analog processing stage includes a subtractor having a first input which is said input of said analog processing stage and having a second input and an output, and wherein said input stage includes a processing loop means shared by said analog processing stage and said digital Doppler processing means connected between said output and said second input of said subtractor for supplying echo signals from a preceding ultrasound pulse to said second input of said subtractor for subtraction, with correlated time, from echo signals from a current ultrasound pulse, said processing loop means including an amplifier stage with a switchable gain, and wherein said digital Doppler signal processing means includes an adder and a switch means in said processing loop means for supplying individual bits from said analog-to-digital converter to a multiple place input of said adder differently weighted dependent on the selected gain of said amplifier.

3. An input stage as claimed in claim 2, wherein said digital Doppler signal processing means further includes a memory in said processing loop means having an input connected to an output of said adder and an output connected to a digital-to-analog converter stage, said digital-to-analog converter stage having an output connected to said second input of said subtractor, said output of said memory also connected to a further input of said adder.

4. An input stage as claimed in claim 2, wherein said multiple place input of said adder has a plurality of most significant bit inputs and a plurality of least significant bit inputs, wherein said amplifier stage is switchable between a high gain and a low gain, said high gain being greater than said low gain by a factor $2^n$, wherein n is the number of least significant bits, and wherein said switch means is a means for supplying said individual bits from said analog-to-digital converter to said most significant bit inputs of said adder given a low gain of said amplifier stage and for supplying said individual bits from said analog-to-digital converter to said least significant bit inputs given a high gain of said amplifier stage.

5. An input stage as claimed in claim 4, wherein said digital-to-analog converter stage comprises a first digital-to-analog converter having a bit width corresponding to the number of most significant bits of said multiple place input of said adder and a second digital-to-analog converter having a bit width corresponding to the number of least significant bits of said multiple place input of said adder, and wherein said processing loop means further includes:
   an attenuator circuit having an input connected to an output of said second digital-to-analog converter;
   an analog sum stage having inputs respectively connected to the output of said first digital-to-analog converter and an output of said attenuator circuit; and
   a low pass filter connected between an output of said analog sum stage and said second input of said subtractor,
and wherein said input stage further comprises a low pass filter connected between said first input of said subtractor and said transducer associated with the channel.

6. An input stage as claimed in claim 3, further comprising means for compensating for amplitude errors in said analog-to-digital converter and in any analog components in said input stage by determining a difference between signals acquired from said analog-to-digital converter and from said analog components from a test signal applied to said input stage in a first balancing step and signals acquired from said analog-to-digital converter and said analog components from the same test signal applied to said input stage in a second balancing step and calculating correction values based on said difference.

7. An input stage as claimed in claim 6, wherein said test signal is a linear ramp function having a slope such that all binary values to be processed by said digital Doppler processing means appear at least once for a selected conversion rate of said analog-to-digital converter.

8. An input stage as claimed in claim 6, wherein said means for correcting comprises:
   a write-read memory having an address input connected to the input of said first digital-to-analog converter, a write input connected to the output of said analog-to-digital converter, and a read output; and
   a further subtractor having a first input connected to said read output of said write-read memory, a second input connected to the output of said analog-to-digital converter, and an output connected to an input of said means for constructing an ultrasound image.

9. An input stage as claimed in claim 8, further comprising:
   ganged switch means for simultaneously connecting the output of said further subtractor to said switch means and disconnecting the output of said analog-to-digital converter from said switch means.

10. An input stage as claimed in claim 1, further comprising:
    means for generating a display connected to an input of said means for constructing an ultrasound image in the event that excursions of said echo signals are too large to be converted undistorted by said analog-to-digital converter.

11. An input stage as claimed in claim 1, wherein said means for constructing an ultrasound image includes a signal memory in which a digitized Doppler difference signal is stored in addition to the ultrasound image signal.

12. An input stage as claimed in claim 11, wherein said image signal and said Doppler difference signal are successively stored in said signal memory.

* * * * *